(12) United States Patent
Mercier

(10) Patent No.: US 7,156,346 B2
(45) Date of Patent: *Jan. 2, 2007

(54) ARRANGEMENT OF SEATS FOR AN AIRCRAFT CABIN

(75) Inventor: Guy Mercier, Neuvy-Pailloux (FR)

(73) Assignee: Societe Industrielle Et Commerciale De Materiel Aeronautique, Issoudun (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/064,852

(22) Filed: Feb. 25, 2005

(65) Prior Publication Data

US 2005/0189451 A1    Sep. 1, 2005

(30) Foreign Application Priority Data

Feb. 26, 2004    (FR)    ................................... 04 50365

(51) Int. Cl.
 *B64D 11/06*    (2006.01)
(52) U.S. Cl. ................................................ 244/118.6
(58) Field of Classification Search ...... 244/122 RAH, 244/118.1–6; 5/9.1, 10.1, 10.5, 118; 114/192, 114/189; 297/232, 257
See application file for complete search history.

(56) References Cited

U.S. PATENT DOCUMENTS

| 1,743,149 | A | * | 1/1930 | Lyford | .......................... | 296/64 |
|---|---|---|---|---|---|---|
| 1,948,200 | A | * | 2/1934 | Bromagem | .................. | 297/249 |
| 2,046,859 | A | * | 7/1936 | Weiss et al. | .................... | 296/64 |
| 2,382,402 | A | * | 8/1945 | De Roode | ............... | 244/118.6 |
| 2,414,730 | A | * | 1/1947 | Flogaus | ......................... | 296/64 |
| 2,557,885 | A | * | 6/1951 | Murphy et al. | .............. | 105/344 |
| 2,583,960 | A | * | 1/1952 | Murphy | ....................... | 105/315 |
| 2,608,366 | A | * | 8/1952 | Jergenson | ................. | 244/118.6 |
| 2,947,349 | A | * | 8/1960 | Kryter | ..................... | 297/174 R |
| 3,730,583 | A | * | 5/1973 | Colovas et al. | ................ | 296/64 |
| 4,382,628 | A | * | 5/1983 | Palmgren | ..................... | 297/232 |
| 4,686,908 | A | * | 8/1987 | Legrand | ...................... | 105/315 |
| 4,936,620 | A | * | 6/1990 | Francois et al. | ............... | 296/64 |
| 5,131,607 | A | * | 7/1992 | Arnold et al. | ............ | 244/118.6 |
| 5,265,828 | A | * | 11/1993 | Bennington | ............. | 244/122 R |
| 5,716,026 | A | * | 2/1998 | Pascasio et al. | .......... | 244/118.6 |
| 6,209,956 | B1 | * | 4/2001 | Dryburgh et al. | ............ | 297/245 |

(Continued)

FOREIGN PATENT DOCUMENTS

EP    1 364 874 A1    11/2006

(Continued)

OTHER PUBLICATIONS

INPI, Search Report issued in connection with French Application No. 0450365 dated Oct. 4, 2004.

*Primary Examiner*—Teri Pham Luu
*Assistant Examiner*—Stephen A Holzen
(74) *Attorney, Agent, or Firm*—Blank Rome LLP

(57) ABSTRACT

An arrangement of individual seats for passengers in an aircraft, comprising a plurality of seats which can be converted into beds and disposed in rows, and comprising two lateral groups (3a; 13a) of two contiguous rows, each group being disposed along a wall (4) of the aircraft fuselage, and at least one central group (3b; 13b) of two contiguous rows, the said central group being separated from each of the lateral groups by a gangway. Each lateral group comprising, between two consecutive groups in a first row, and a pitch (P1) able to allow transverse passage for the passengers in the other row. The at least one central group comprising, between two adjacent seats in the same row, and a pitch (P2) less than the pitch provided in the lateral groups.

7 Claims, 2 Drawing Sheets

U.S. PATENT DOCUMENTS

| | | | |
|---|---|---|---|
| 6,913,227 B1* | 7/2005 | Mahmulyin | 244/118.5 |
| 2002/0000491 A1* | 1/2002 | Nieberle | 244/118.6 |
| 2002/0070314 A1* | 6/2002 | Schmidt-Schaeffer | 244/118.6 |
| 2003/0218095 A1* | 11/2003 | Saint Jalmes | 244/118.5 |
| 2004/0232283 A1* | 11/2004 | Ferry et al. | 244/118.6 |
| 2005/0001097 A1* | 1/2005 | Saint-Jalmes | 244/118.6 |
| 2005/0001098 A1* | 1/2005 | Saint-Jalmes | 244/118.6 |
| 2005/0067870 A1* | 3/2005 | Rezag et al. | 297/354.13 |
| 2005/0189451 A1* | 9/2005 | Mercier | 244/118.6 |
| 2006/0097553 A1* | 5/2006 | Spurlock et al. | 297/248 |

FOREIGN PATENT DOCUMENTS

| | | |
|---|---|---|
| GB | 2 362 095 A | 11/2001 |
| WO | WO 03/013903 A1 | 2/2003 |

* cited by examiner

ARRANGEMENT OF SEATS FOR AN AIRCRAFT CABIN

RELATED APPLICATION

This application claims priority under 35 U.S.C. § 119 to French patent application no. 0450365, filed Feb. 26, 2004, the subject matter of which is herein incorporated by reference.

FIELD OF THE INVENTION

The invention concerns an arrangement of individual seats for passengers in an aircraft and more particularly an arrangement of seats comprising a plurality of seats which can be converted into beds and disposed in rows, each row extending in the longitudinal direction of the vehicle, and each seat being oriented towards the front of the aircraft.

BACKGROUND OF THE INVENTION

In aircraft cabins in which the seats can be converted into beds, the arrangement of the said seats must take account of several criteria: it is in fact necessary to provide the passengers not only with a high level of comfort but also optimum safety conditions, whilst providing a sufficient number of seats per cabin to meet the economical requirements related to this type of transport.

Arrangements of seats are already known which can be converted into beds, for aircraft cabins, in which the seats are disposed in several longitudinal rows. These arrangements provide a central group and two lateral groups of rows situated in each side of the central group, the central group being separated from the two lateral groups respectively by a gangway. However, in this type of arrangement, the passengers who are situated at a distance from a gangway are obliged, in order to gain access to the said gangway, to step over their neighbour if the latter has placed his seat in the bed position. This type of arrangement is therefore not very satisfactory in terms of comfort, but also in terms of safety, if for example the passengers have to go quickly to the emergency exits.

SUMMARY OF THE INVENTION

To resolve these drawbacks, the invention proposes an arrangement of seats for a transport vehicle which provides both the comfort and security of passengers, whilst providing a number of places in accordance with the economic requirements related to the type of transport concerned.

To this end, the object of the invention is an arrangement of individual seats for passengers in an aircraft, comprising a plurality of seats which can be converted into beds and disposed in rows, each row extending in the longitudinal direction of the aircraft, and each seat being oriented towards the front of the aircraft, characterised in that it comprises:

two lateral groups of two contiguous rows, each group being disposed along a wall of the aircraft fuselage, the seats in one row being offset longitudinally with respect to the seats in the other row, and at least one central group of two contiguous rows, the seats in one row being offset longitudinally with respect to the seats in the other row, the said central group being separated from each of the lateral groups by an gangway;

each lateral group comprising, between two consecutive seats in a first row, a pitch able to allow transverse passage to a gangway for the passengers in the second row, when the corresponding seat in the first row is in the bed position, and at least one central group comprising, between two consecutive seats in the same row, a pitch less than the pitch provided in the lateral groups.

Such an arrangement has the advantage of avoiding all the passengers stepping over the adjacent passenger in order to reach the gangway when the seat of the other passenger is placed in the bed position. In addition, this arrangement preserves the privacy of each passenger and thus improves his comfort appreciably.

In addition, the gap between the seats is different according to the row in order to optimise the number of seats disposed in the cabin. The lateral groups of rows have sufficient gap to allow the passage of a user between two seats in the bed position, whilst the central groups have a lesser gap because all the occupants of the seats in these rows have access to a gangway.

In a particular embodiment, the seat arrangement according to the invention comprises two central groups, separated from one another by a gangway.

According to this embodiment, the presence of three gangways appreciably improves the circulation of passengers in the cabin.

Also in a particular embodiment, each seat is provided with a back rest adjustable for inclination, a squab adjustable for inclination, a leg rest adjustable for inclination and a fixed separation shell substantially in an S shape, the said shell comprising a first transverse wall extending behind the back rest of the said seat, a second transverse wall extending in front of the adjacent seat in the contiguous row, and a longitudinal wall extending between the two transverse walls.

A space can also be provided between two consecutive seats on the rows disposed along a wall of the aircraft fuselage.

BRIEF DESCRIPTION OF THE DRAWINGS

Other objects and advantages of the invention will emerge during the following description, given with reference to the accompanying drawings, in which.

DETAILED DESCRIPTION OF THE PREFERRED EMBODIMENT

Figure 1:
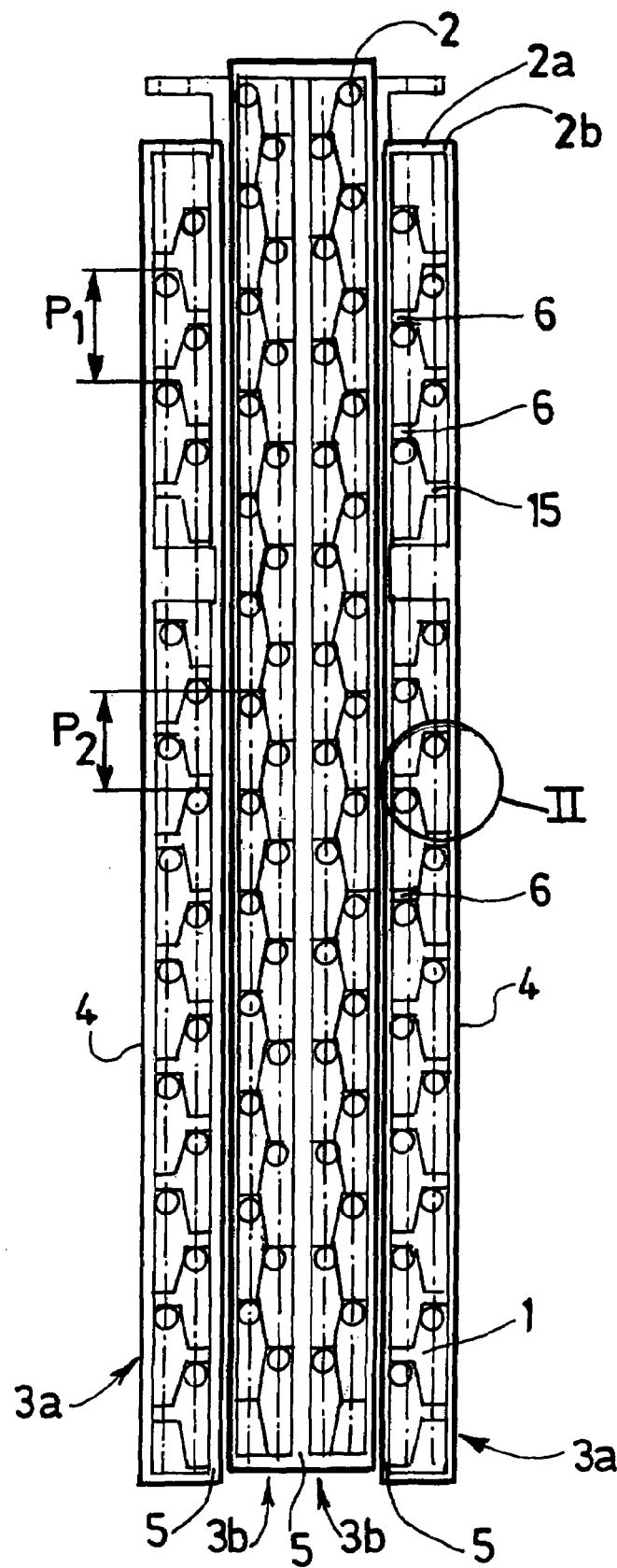
FIG. 1 is a schematic plan view of part of an aircraft cabin, comprising an arrangement of seats according to the invention.
Figure 3:
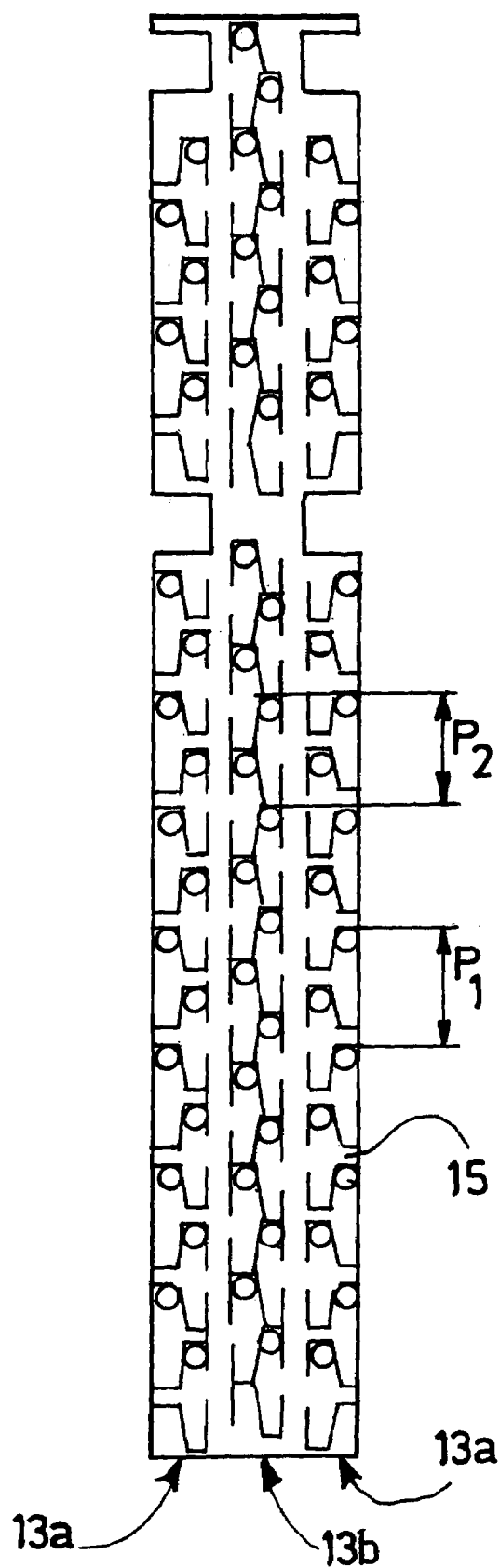
FIG. 3 is a view similar to FIG. 1 of another embodiment.

The arrangement of seats depicted in FIG. 1 is intended for aircraft of the long haul type. It comprises a plurality of seats 1 which can be converted into beds, disposed in eight parallel rows 2, each row 2 extending in the longitudinal direction of the aircraft, that is to say from front to rear.

The rows 2 of seats are grouped in pairs, so as to form four parallel groups 3, namely two lateral groups 3a, close to the walls of the aircraft, and two central groups 3b. Each group 3 is separated from an adjacent group by a gangway 5. Three gangways 5 are therefore provided in the cabin: one between each lateral group 3a and the adjacent central group 3b, and a gangway between the two central groups 3b.

In addition, in each group 3 of two rows, the seat in a first row 2a and the adjacent seat in the second row 2b are offset longitudinally with respect to one another.

In the example depicted, the two lateral groups 3a of rows comprise a transverse passage 6 provided between two adjacent seats in a first row 2a, this passage 6 being arranged to allow passage of the passenger in the adjacent seat in the second row 2b, in particular when the said seat is in the bed position. The longitudinal pitch of the seats is here equal to P1.

On the other hand, the two central groups 3b of rows do not comprise any transverse passage. The longitudinal pitch of the seats is then equal to P2, less than P1.

According to the embodiment depicted, the passengers situated against the walls 4 of the aircraft can therefore leave their place using the passage 6, and all the other passengers have access directly to one or other of the gangways 5 either to their right or to their left.

The seats 1 are provided with a back rest, a squab and a leg rest, all adjustable for inclination. They also comprise a fixed separation shell disposed behind the back rest, referred to as the rear fixed separation shell.

The fixed shell is here substantially in the shape of an S, comprising a first transverse wall 7 extending behind the back rest of the said seat, a second transverse wall 8 extending in front of the seat adjacent to the contiguous row, and a longitudinal wall 9 extending between the two transverse walls.

The seats 1 are arranged so that, in the bed position, the leg rest of the seat is disposed under the fixed shell of the adjacent seat in the longitudinal direction, referred to as the front fixed separation shell.

In particular, such seats can be in accordance with those which are the subject of the patent FR-2 820 400, in which the movements of each of the elements are independent of each other and the fixed separation shells, and in which control means enable the seat to adopt, between a straight take-off and landing position of the seat and an elongated position of the seat, all the positions allowed by the space lying between the front fixed separation shell and the rear fixed separation shell.

Figure 2:
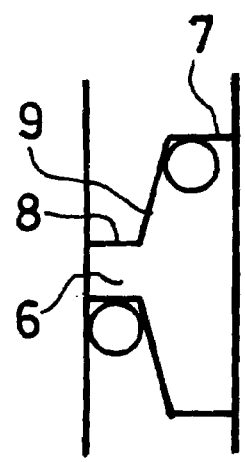
FIG. 2 is a view to a larger scale of the detail II in FIG. 1.

In the embodiment in FIG. 2, a single central group 13b of two rows of seats is provided, identical to one of the groups 13a in FIG. 1. The lateral groups 3a are identical to those in FIG. 1.

As before, the pitch P1 of the seats in the lateral group 13a is greater than the pitch P2 of the seats in the central group 13b.

The seats can be of the same type as those described with reference to FIG. 1.

It will be noted that, in the two embodiments depicted, a space 15 such as the passages 6 is provided longitudinally between two consecutive seats in the rows adjacent to a wall of the fuselage of the aircraft. These spaces 15 can for example be provided in storage units.

The invention claimed is:

1. An arrangement of individual seats for passengers in an aircraft, comprising a plurality of seats which can be converted into beds and disposed in rows, each row extending in the longitudinal direction of the aircraft, and each seat being oriented towards the front of the aircraft, characterized in that it comprises:

first and second lateral groups of two contiguous rows, each group being disposed along a wall of the aircraft fuselage, the seats in one row of said first lateral group being offset longitudinally with respect to the seats in the other row of said first lateral group, and the seats in one row of said second lateral group being offset longitudinally with respect to the seats in the other row of said second lateral group, and a first central group of two contiguous rows, the seats in one row of said first central group being offset longitudinally with respect to the seats in the other row of said first central group, said first central group being separated from said first and second lateral groups by first and second gangways;

each row of said first and second lateral groups defining, between two consecutive seats in each row, a first longitudinal pitch able to allow transverse passage for the passengers to one of said first and second gangways, and each row of said first central group defining, between two consecutive seats in each row, a second longitudinal pitch smaller than the first longitudinal pitch provided in the first and second lateral groups, and each seat is provided with a fixed separation shell substantially in an S shape, said shell comprising a first transverse wall extending behind said seat, a second transverse wall extending in front of an adjacent seat in a contiguous row, and a longitudinal wall extending between the two transverse walls.

2. An arrangement according to claim 1, characterized in that it comprises a second central group, separated from said first central group by a third gangway.

3. An arrangement according to claim 1, characterized in that the seats are arranged so that, in the bed position, a leg rest of each seat is disposed under the fixed shell of an adjacent seat in the longitudinal direction.

4. An arrangement according to claim 1, characterized in that, on the rows disposed along the wall of the aircraft fuselage, a space is provided between two consecutive seats.

5. An arrangement of individual seats for passengers in an aircraft, comprising of:

first and second lateral groups of two contiguous rows, each row in the first and second lateral groups including a plurality of seats, and each row of the first and second lateral groups defining between two consecutive seats in each row a first longitudinal pitch;

a central group of two contiguous rows, each row in the central group including a plurality of seats, and each row of the central group defining between two consecutive seats in each row a second longitudinal pitch smaller than the first longitudinal pitch;

a first gangway defined between the first lateral group and the central group; and a second gangway defined between the second lateral group and the central group, whereby the first and second longitudinal pitches provide access to the first and second gangways, respectively, each seat is provided with a fixed separation shell substantially in an S shape, said shell comprising a first transverse wall extending behind said seat, a second transverse wall extending in front of an adjacent seat in a contiguous row, and a longitudinal wall extending between the two transverse walls.

6. An arrangement according to claim 5, wherein the seats in one row of the first lateral group are offset longitudinally with respect to the seats in the other row of the first lateral group; and the seats in one row of the second lateral group are offset longitudinally with respect to the seats in the other row of the second lateral group.

7. An arrangement according to claim 5, wherein the seats in one row of the central group are offset longitudinally with respect to the seats in the other row of central group.

* * * * *